Jan. 29, 1924.
A. LUONGO
1,481,804
GARMENT CUTTING DEVICE
Filed Sept. 23, 1921  6 Sheets-Sheet 1
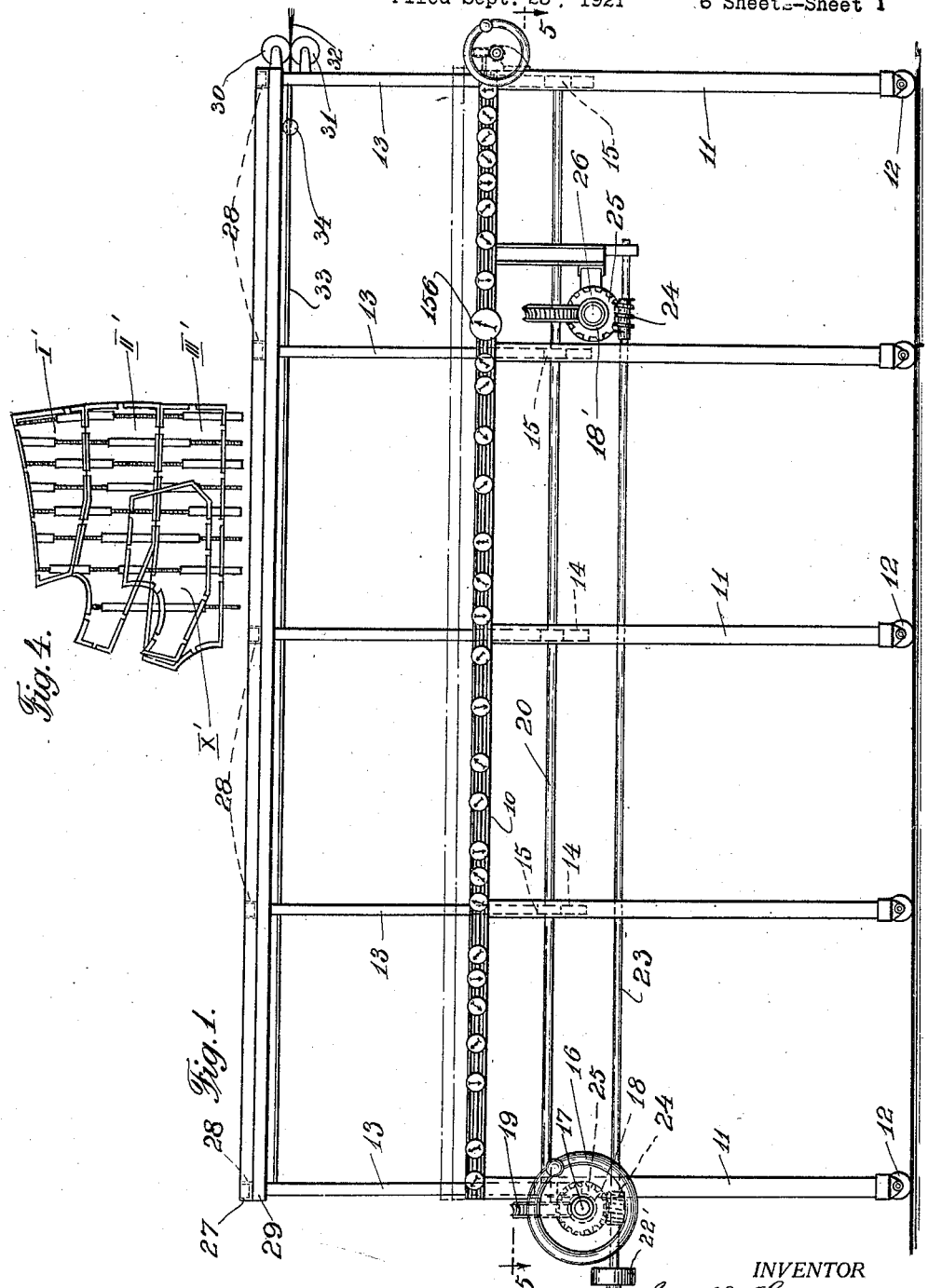
INVENTOR
Aniello Luongo
BY
Paul M Klein
ATTORNEY Jan. 29, 1924.  
A. LUONGO  
1,481,804  
GARMENT CUTTING DEVICE  
Filed Sept. 23, 1921  
6 Sheets-Sheet 2
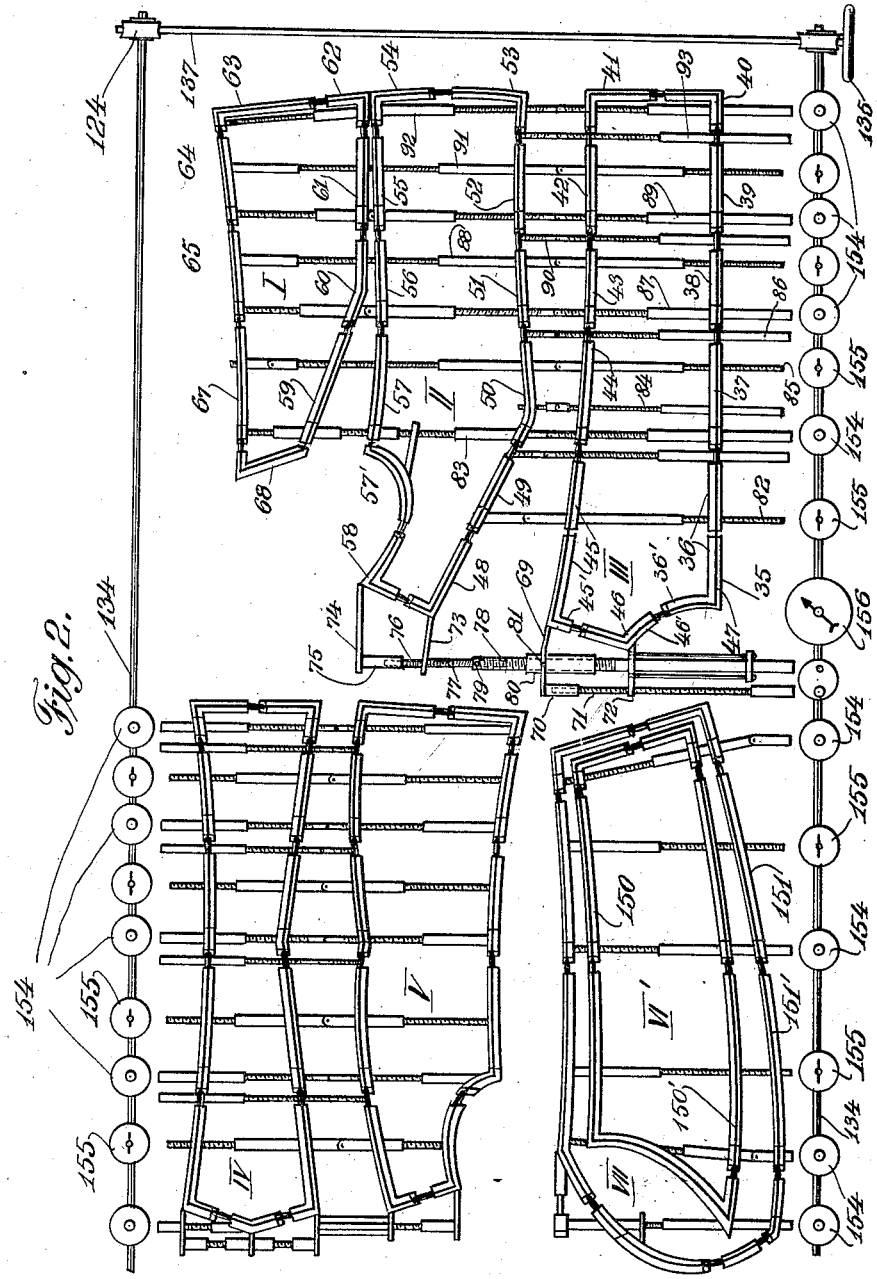
INVENTOR  
BY Aniello Luongo  
ATTORNEY

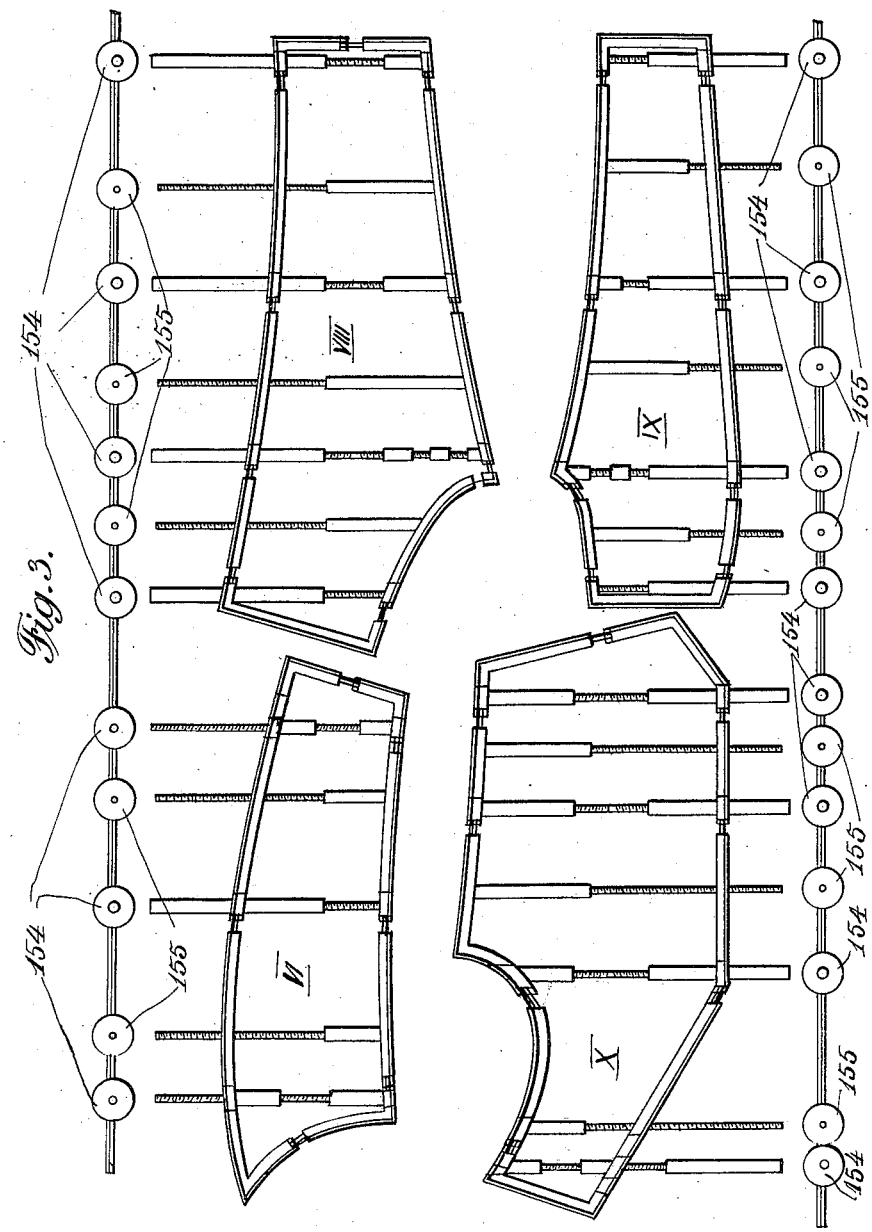

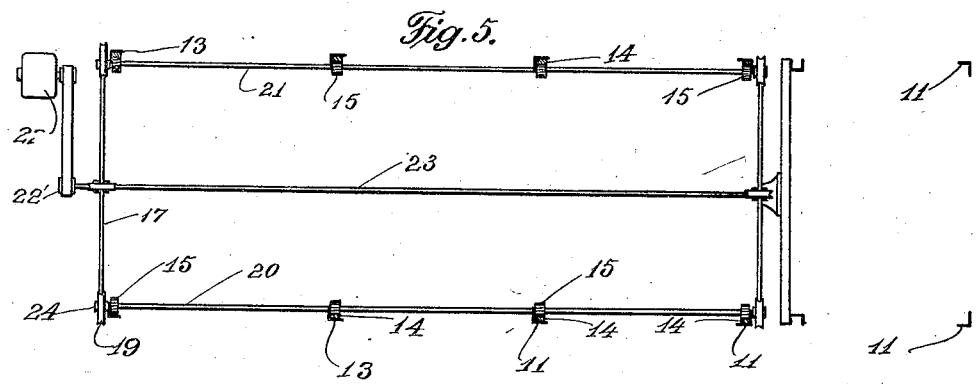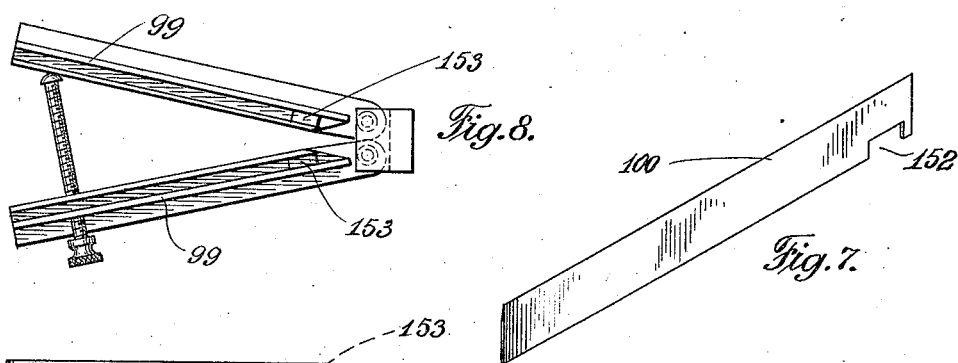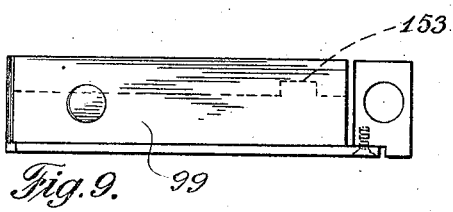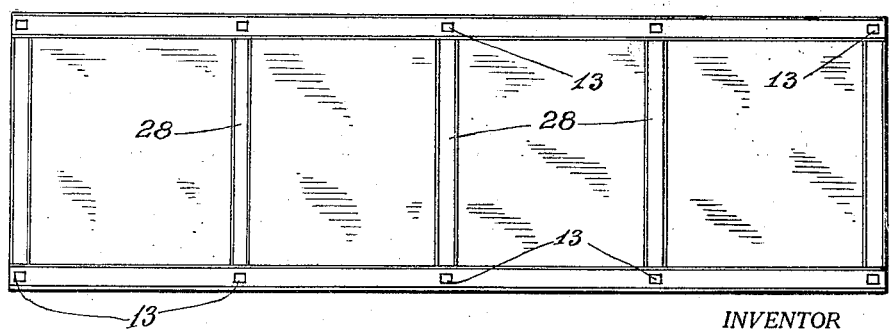

Jan. 29, 1924.

A. LUONGO

GARMENT CUTTING DEVICE

Filed Sept. 23, 1921

INVENTOR
Aniello Luongo
BY
ATTORNEY

Jan. 29, 1924.
A. LUONGO
1,481,804
GARMENT CUTTING DEVICE
Filed Sept. 23, 1921
6 Sheets-Sheet 6
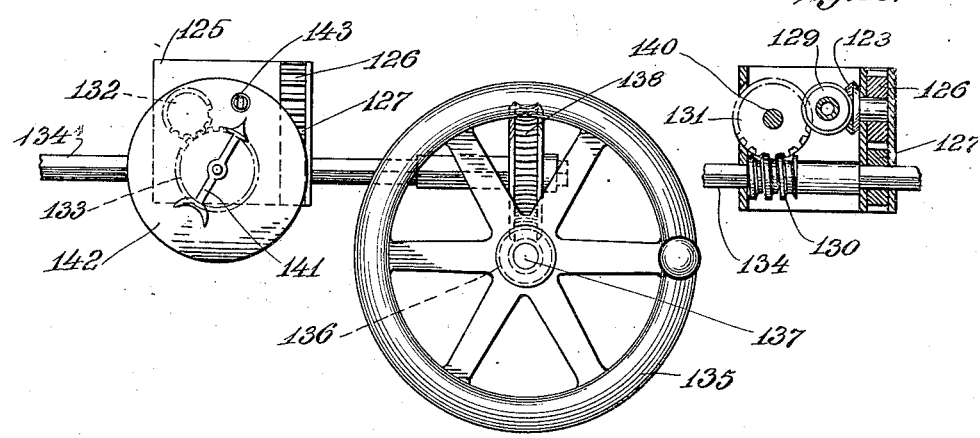
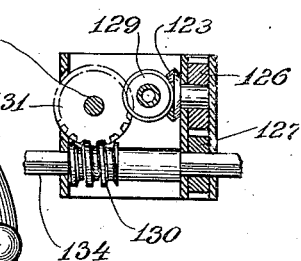
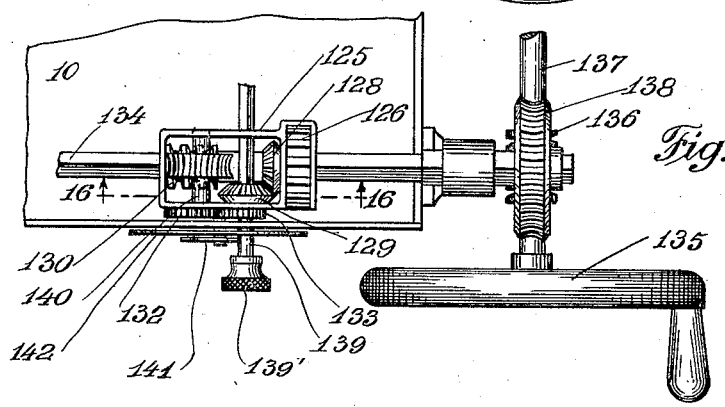
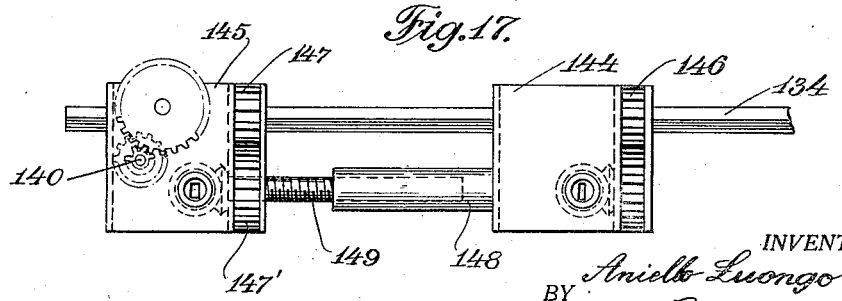
INVENTOR
Aniello Luongo
BY
ATTORNEY Patented Jan. 29, 1924.

1,481,804

UNITED STATES PATENT OFFICE.

ANIELLO LUONGO, OF NEW YORK, N. Y.

GARMENT-CUTTING DEVICE.

Application filed September 23, 1921. Serial No. 502,804.

*To all whom it may concern:*

Be it known that I, ANIELLO LUONGO, a citizen of the United States, and resident of New York, in the county of New York and State of New York, have invented certain new and useful Improvements in Garment-Cutting Devices, of which the following is a specification.

This invention relates generally to garment cutting devices and particularly to the kind whereby garments may be quickly cut to desired shapes and sizes.

One of the prime objects of my invention is to provide pattern-like forms adjustable as to size and shape and provided with marking or cutting elements adapted to shape themselves to the pattern-like forms and either mark or cut one or more layers of fabric or other material at one operation.

Another object of my invention is to provide within such pattern-like forms adjustable means which may be operated either individually or in unison.

Another object of my invention is to provide means adapted to indicate the changes in shape and size of such pattern-like forms.

A further object of my invention is to provide suitable means for the support of a plurality of such pattern-like forms.

Another object is to provide in combination with such supporting means, a press platform adapted to bear against the marking or cutting elements of the pattern-like forms.

Another object is to provide suitable operating means for either lowering or elevating said press platform.

Another object is to provide operating means for simultaneously adjusting the size or sizes of one or a plurality of such pattern-like forms, and a main indicating device adapted to indicate the size for a set of pattern-like forms.

Another object of my invention is to provide in combination with the press platform, cloth receiving and adjusting means adapted to suspend fabric just below said press platform prior to subjecting it to the marking or cutting operation.

The foregoing objects, and the operation and construction of my device will be more fully apparent when explained in general before proceeding to describe the details of my machine.

The heretofore used methods of cutting garments particularly for the "ready-made" trade is well-known. Usually standard patterns are prepared corresponding to various sizes. The cutting of garments according to these patterns is accomplished by tracing the outlines of the patterns upon the top layer of a pile of fabric, which is then cut accordingly. It is obvious that garments made according to the standard patterns will not fit an individual unless he actually happens to be of standard size. In most cases, however, the garments have to be fitted to the individual's measurements, as it is obvious that once garments are cut to the standard patterns, such alterations will not result in a perfect fit. The use of standard patterns requires a great deal of expenditure, since they have to be replaced very often according to the style in vogue and entail additional expense through the alterations which become necessary after the garment is finished.

My device is designed to obviate these disadvantages and to provide only one set of permanent patterns which may be changed to various sizes, forms, or styles without necessitating any renewal, except the sharpening of the edges of the knives associated with my device.

The general principle of my invention consists of a combination of co-acting, interconnected links forming pattern-like shapes, with which are associated marking or cutting elements which I will term for short "blades," and which are adapted to conform with the shape imparted to the patterns.

Associated with these links is a plurality of adjusting elements at such portions of the pattern, corresponding to places of measurements usually taken about the body of an individual, so that their shapes at these places may be adjusted to any desired size. So for instance adjustments may be made at the part corresponding to the chest, the waist, armhole, etc.

There is another set of adjusting means associated with the patterns which permit the lengthening or shortening of the shapes. Each of the adjusting means are equipped with a dial indicating various sizes to which they may be adjusted. These dials are equipped with gear transmissions which may be operated simultaneously from one point of the machine, provided that the cutting of normal sizes takes place. However in the event garments are to be cut in the manner generally known as "custom-made"—that is where the measurements of a person are taken and the garments are cut according to those measurements—the machine is set to the normal size, and in places where the normal size does not correspond with the measurements taken, the gear arrangement is disconnected from that particular section of the pattern and this section is then manually adjusted to the proper size.

The adjustment of my device necessitates that the blades for marking or cutting the garments assume the proper form imparted to the pattern. I therefore provide double blades between two sections or links which are adapted to be spread or drawn together. Each of the blades is attached to one of the sections and extends into the other section, so that when such links are spread apart, the blades still form a continuous line for the marking or cutting operation. The patterns are preferably placed upon a stationary table, above which is arranged a press platform equipped with cloth suspension means and adapted to be pressed against the blades when the patterns have been set to proper dimensions.

The foregoing will be more fully apparent from the following description in connection with the accompanying drawings, indicating in a diagrammatical way the principle of my construction, and in which:

Figure 1 is a diagrammatical side elevation of my device.

Figures 2 and 3 are plan views of my patterns.

Figure 4 indicates a diagrammatical plan view of a modified pattern.

Figure 5 is a diagrammatical sectional view taken on line 5—5 of Figure 1.

Figure 6 is a top view of the press platform of my device.

Figure 7 represents a typical form of a blade.

Figure 8 is a top view and Figure 9 a side elevation of a typical portion of my device for marking or cutting notches in fabrics.

Figure 10:
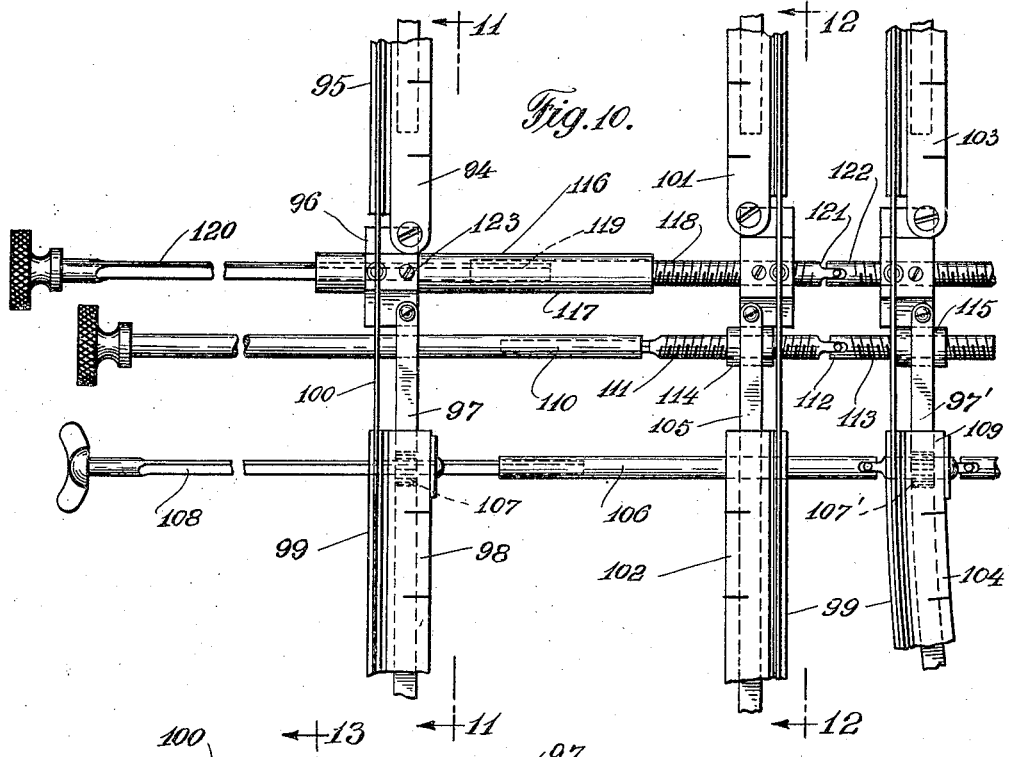

Figure 10 represents a typical arrangement of my adjusting means.

Figure 11:
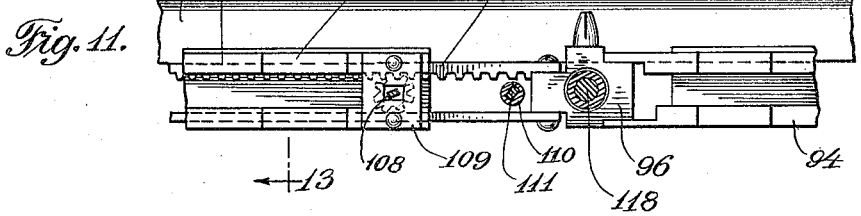

Figure 11 is a cross sectional view taken on line 11—11 of Fig. 10.

Figure 12:
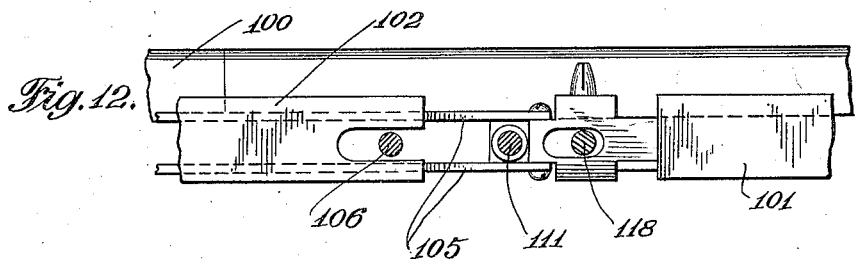

Figure 12 is a cross sectional view taken on lines 12—12 of Fig. 10.

Figure 13:
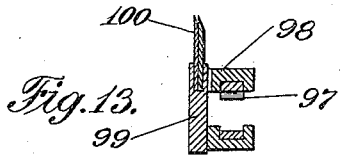

Figure 13 is a cross sectional view taken on line 13—13 of Fig. 11.

Figure 14 is a partial detail view of my pattern operating mechanism.

Figure 15 is a top view thereof.

Figure 16 is a sectional view taken on line 16—16 of Fig. 15.

Figure 17 represents a detail view of my length adjusting mechanism.

Referring to the drawings numeral 10 denotes a stationary table or base, supported by a plurality of legs 11 which are preferably equipped with rollers 12 to permit the moving of the table upon the floor. The legs are preferably made of channels or angle irons, in which are guided uprights 13 equipped with gear racks 14 (Fig. 5) which are operated in vertical upward or downward direction by means of gears 15.

The latter are driven either manually or by power. When driven manually, a hand wheel 16 is operated upon shaft 17 on which is provided a worm 18 engaging a worm gear 19, which latter is keyed to a shaft 20, upon which are also keyed gears 15. By means of a worm and worm gear transmission, the opposite shaft 21 is operated simultaneously with shaft 20. When my device is to be driven by power, as for instance by an electric motor, as indicated at 22, a central shaft 23, upon which pulley 22' is keyed, is caused to rotate, whereby worms 24, keyed to shaft 23, revolve which again cause the worm gears 25 to rotate. On the shaft of the worm gears 25 are keyed respectively worms 18 and 18' which cause the operation of shaft 20.

The uprights 13 are permanently attached to the press table or platform 27 as shown in detail in Fig. 6. The latter is composed of an upper plate provided with reinforcements 28, and a lower plate indicated at 29, which is preferably made of yieldable material, as for instance rubber, cork, soft wood, felt or the like, in which the blades of my device may bury themselves.

Attached to the platform 27 is a set of rollers 30 and 31, through which is drawn one or more layers of the fabric indicated at 32. Connecting the end standards of the platform is a pair of guide rods indicated at 33, upon which glides a material attaching member indicated at 34 and into which the end of the material is placed and drawn from the end where rollers 30 and 31 are attached to the opposite end of the platform, so that the material is drawn over the entire length of the machine.

Through the operation of shafts 20 platform 27 may be lowered or elevated toward or from the base or table 10. Its lowered position is indicated in broken lines in Fig. 1.

Placed upon table 10 are my patterns indicated diagrammatically in Figures 2 and 3, where numerals I and II represent a pattern of the side of a garment. Numeral III represents the front portion of the coat of a garment, while IV and V represents the back of the coat portion, and numeral VI is a pattern of the under sleeve, numeral VII the upper sleeve portion. Numeral VIII is a pattern of the back portion of the trousers;

IX is the front portion of the trousers; and X is a pattern of the front of the vest.

In Fig. 4 there is shown a pattern of the side and front portion of the coat indicated respectively with numerals I', II', and III' and within that pattern there is shown a vest indicated at X'. Similar to the vest pattern there is shown in Fig. 2, an inner under sleeve pattern VI' within the upper sleeve pattern VII.

Since the principle of construction and operation is similar in all patterns, I shall restrict my description to the pattern indicating the front and side portions of the coat.

Referring to the right half of Fig. 2, the front section indicated at III consists of a substantially straight front line 35 which is composed of a plurality of interconnecting and co-acting links 36, 37, 38 and 39, and an end link 40 which is angularly shaped, similarly to link 41 from which extends again in the opposite direction another series of links 42, 43, 44, and 45. Upper link 36 is provided with a curved portion 36' and between links 36 and 45 there is an intermediate link 46 defining the collar cut-out of the garment.

All of the links are preferably provided with a base adapted to rest upon table 10 and a channel-formed upright portion in which latter there are secured blades indicated at 47, which extend over the entire length and over the spaces between such links.

Near the spaces between the links, two blades are preferably provided, so that the cutting or marking edge of the pattern will extend over and will assume an endless line corresponding to the shape imparted to the pattern.

It will be seen that link 46 forms at 46' a continuation of the cut-out collar portion 36', while the straight portion of link 46 together with the angle portion 45' of link 45 comprises the front shoulder line of the garment.

Section portion II comprises the middle portion of the coat, and is composed of an angularly shaped top link 48, an intermediate link 49, a curved link 50, two intermediate links 51 and 52, an angular end link 53, the lower part of which forms the lower end of the coat, and which continues to another angular link 54. There are a number of intermediate links 55 and 56 continuing upward to the arm hole link 57, the curved portion 57' of which represents the arm hole.

Between the link portion 57' and the link 48 there is an angular intermediate link 58 completing the contour of the arm hole at one end and the shoulder portion at the other end.

The side portion I is also composed of a plurality of links 59, 60 and 61, lower angular end links 62 and 63; intermediate links 64, 65, 67; and a top link 68 forming the continuation of the armhole line.

Referring to portion III it will be seen that extending from link 45 there is a bracket 69 to the end of which is attached an internally threaded tube 70, which is engaged by a threaded spindle 71 rotatably mounted in a bracket 72 which connects with link 46. When spindle 71 is operated either in clockwise or anti-clockwise direction, the distance between the sharp points of link 46 and link 45 is either increased or reduced. Similarly is the distance in pattern section II altered between links 48 and 58. From the former there extends a bracket 73, from the latter a bracket indicated at 74, to which is attached a tube 75. Engaging the tube is a spindle 76 which possesses a universal link indicated at 77. When the spindle is rotated, the distance between the sharp point of links 48 and 58 is either reduced or increased.

The other end of spindle 76 protrudes into a tube 78 to which it is attached by means of a set screw 79. Tube 78 is externally threaded and engages an internally threaded tube 80, which is attached to bracket 69 of link 45. Tube 80 may be made either stationary within bracket 69 by tightening screw 81, or may revolve together with tube 78 by loosening set screw 81.

When it is desired to adjust the distance between links 48 and 58, set screw 81 is loosened and screw 79 is tightened, thereby permitting tube 78 to rotate directly spindle 76, while tube 80 will rotate simultaneously with tube 78. When it is desired to adjust the distance between link 45 and link 48, set screw 79 is loosened and screw 81 is tightened, the latter operation preventing tube 80 from rotating. Now when tube 78 is turned either to the left or right, tube 80 acts as a nut and the distance between the links 45 and 48 may be adjusted.

By means of an arrangement which will be explained later, and indicated at 82, the distance between link pair 48—58, and link pair 49—57' in section II may be adjusted.

Similarly the adjustment of the length of the severed links 36 and 45 is accomplished, so that the entire length between the shoulder line and the bust line of the pattern may be either lengthened or shortened.

By means of an arrangement indicated at 83 the bust line of all three pattern sections may be simultaneously shortened or lengthened. By means of arrangement 84 the notch or cut-out formed between the right ends of links 44—50 and the sharp points of links 45—48, may be adjusted. By means of arrangement indicated at 85, the waist line of the pattern may be altered. By arrangement indicated at 86, the distance between pattern sections II and III may be adjusted.

The arrangement indicated at 87 serves for adjusting the width of the waist line of the several pattern sections. For a similar purpose serves the arrangement indicated at 88, while length adjustment is accomplished at the lower portion of the pattern by an arrangement indicated at 89.

The adjustment between the lower portions of pattern sections II and III may be arranged by the spindle arrangement indicated at 90. The width arrangement below the waistline of the pattern is indicated at 91 and 92, while the lowest distancing arrangement between patterns II and III is indicated at 93.

In order to explain the operation of the several adjusting arrangements, the details shown in Figs. 10, 11, 12, and 13, will be explained.

Referring to Fig. 10, numeral 94 denotes one link portion provided with a channel extension 95 and attached to an intermediate link 96 connected through that link, and a gear rack frame 97, to link 98. The latter is also equipped with a receiving channel 99. In the channels 95 and 99 there is provided a double knife indicated at 100 and shown in detail in Fig. 13.

Similarly arranged are the link portions 101 and 102, and also link portions 103 and 104. However, instead of a gear rack between link portions 101 and 102, there are provided guide members 105 upon which link portion 102 may glide.

The aforementioned arrangement is adapted for the adjustment of the length of the patterns—that is the adjustment of distances between links 94—98—101—102— and—103—104—respectively.

It will be observed that passing through the gear rack arrangements 97 and 97′ and through the guides 105 there is arranged a member indicated at 106 equipped with gears 107 and 107′ engaging gear racks 97 and 97′, respectively. By turning rod 108 either in clockwise or in anti-clockwise direction, gears 107 and 107′ are caused to rotate. The gears being lodged and permanently associated with the ends 109 and 109′ of link portions 98 and 104, respectively, cause these link portions to travel either from or toward link portions 94 and 103, and while so traveling cause also link portions 101 and 102 to travel either toward or from each other.

By means of the typical arrangement indicated at 110, the distance between link group 101—102, and group 103—104 may be adjusted. It will be seen that rod 110 engages a spindle 111 which is connected by a universal link 112 to spindle 113. These spindles play within nuts 114 and 115, respectively, which nuts are permanently associated with guide members 105 and gear rack members 97′. By means of the arrangement indicated at 116, the distance between the link member pairs 94—98, and 101—102 may be adjusted.

It will be seen that this arrangement consists of an internally threaded tube 117 which is engaged by spindle 118. The spindle 118 is preferably hollow at its end as indicated at 119 and may be engaged by a square rod member 120 and rotated thereby in either clockwise or anti-clockwise direction, thereby causing the reduction or expansion of the distances between the aforesaid link member pairs. Spindle 118 is connected by means of a universal link 121 to spindle 122 by means of which the distance between link members 103—104 and the corresponding link member (not shown in the drawing) is adjusted.

If it is desired that the width adjustment between link member pairs 94—98 and 101—102 should not take place, but only the adjustment between link member pairs 103—104 and its corresponding pair (not shown), this is accomplished by loosening set screw 123 which normally holds tubular member 117 against rotation. When permitting member 117 to rotate with spindle 118, the distance between link pairs 94—98 and 101—102 will not be altered. The above movements are the principle movements of my arrangement and are typical in their construction.

The operation of simultaneously adjusting the patterns to their proper shapes is accomplished by an arrangement indicated at 124 in Fig. 2 and shown in details in Figs. 14, 15, 16 and 17.

Each of the spindles extending from the patterns are connected with an individual gear box 125, which generally consists of a pair of spur gears 126, and 127, a pair of mitre gears 128 and 129, a worm 130, a worm gear 131, and gears 132 and 133. As may be seen spur gear 127 and worm 130 are operated by a square shaft 134 which again is rotated by means of a hand wheel 135 keyed together with worm 136 to shaft 137, said worm engaging worm gear 138, the latter being permanently associated with square shaft 134.

The arrangement shown in Fig. 2 indicates that a plurality of inter-connected shafts extend about the table and engage the several gear boxes 125 indicated in this figure by dials. Now when wheel 135 is operated spur gear 127 will cause the rotation of spur gear 126 which again will rotate mitre gear 128; and this in turn will cause the rotation of mitre gear 129 which engages an operating rod 139 as shown in Fig. 15, which rod forms an operative connection between the gear boxes and spindles. (See also Fig. 10, operating rods 108 and 120.)

While shaft 134 is rotated worm 130 is also caused to rotate and transmits its motion to the worm gear 131 which is connected by shaft 140 to the outer gear 132 which turns gear 133 which latter operates an indicator hand 141 against the dial 142 permanently associated with box 125.

It will be observed that the dial 142 is provided with an opening 143 through which passes the operating rod 139. The latter is equipped with a knurled handle 139'.

Comparing Figs. 14, 15, 16 with Fig. 10, it will be evident that rod 139 (which may for instance correspond to the rod 120 shown in Fig. 10) may be withdrawn when so desired in order to render arrangement 116 inoperative. In other words, if it is desired that through the operation of wheel 135, one particular gear box shall not cause the operation of the corresponding adjusting arrangement, the operating rod 139 or its equivalent is withdrawn from the gear box.

Of course after withdrawing such operating rod, it is evident that its corresponding adjusting arrangement may be adjusted by hand.

In Fig. 17 there is shown a combination of a pair of gear boxes 144 and 145 through which passes a square shaft 134 and operates simultaneously spur gears 146 and 147. Permanently attached to gear box 144 and held against rotation is an internally threaded tube 148 engaged by a threaded spindle 149 which is operated through spur gear 147, engaging another spur gear 147'.

It is obvious that the spindle is rotatable and when driven in one direction will be drawn into tube 148 and when rotated in opposite direction will be withdrawn therefrom, thereby causing the adjustment of the distance between gear boxes 144 and 145.

In gear box 145 there is a similar arrangement of gears, worm and worm wheel as that shown in Figs. 14, 15 and 16, while gear box 144 is shown here to serve merely for the purpose of adjusting the distances between the two boxes. However, also that gear box may be arranged similarly to gear box 145.

The arrangement shown in Fig. 17 is particularly designed to be connected with the pattern adjusting arrangement adapted to adjust the lengths of the shapes. In other words the boxes follow the motion of the length adjustments of the pattern links.

As has been said before the blades may be used either for cutting or marking purposes, and attention is called to sections VI' and VII' of Fig. 2, and to sections I', II' and III', and section X' of Fig. 4.

In the former there is shown the lower sleeve pattern 150 arranged within the upper sleeve pattern 151. The upper sleeve pattern is provided with cutting knives indicated at 151', while the lower sleeve pattern is provided with marking blades 150'. The latter are preferably coated with chalk or any other marking material, and while knives 151' are cutting the fabric, the blades 150' are marking for instance a sheet of paper which later on may serve as a pattern according to which remnants of cloth may be cut.

It will be evident that the adjustment of both the upper and lower sleeve patterns is simultaneous, since the adjusting elements are connected in both the inner and outer patterns.

Similarly arranged is the cutting pattern shown in Fig. 4 where within the front portion of the coat pattern II' and III' there is arranged a marking pattern X' corresponding to the front part of the vest. It will also be evident that the adjustment of the vest pattern will correspond to the adjustment of the coat pattern in width, length, or other adjustments. Also in this arrangement it is clear that the blades of the coat pattern will cut the material while the blades of the vest pattern will mark a sheet laid upon these blades before the cutting operation has taken place.

The marking patterns as shown in Figs. 2 and 4 are merely illustrative of the various possible arrangements of my device.

Referring to Figs. 7, 8, and 9 it will be seen that blades 100 (Fig. 7) are provided with a recess 152 adapted to engage corresponding lugs 153 provided within the channel extensions 99 of the knife supports so as to prevent the blades from leaving their respective channels while permitting them to slide within the channels of the adjacent links.

From Figs. 2 and 3 it will be evident that there are two sets of dials connecting with the two sets of adjusting means—that is one set indicated at 154 corresponding to the length adjusting means; while dials 155 correspond to the width adjusting means of the patterns. There is a main dial 156 which is connected with square shaft 134 and which indicates the setting of the entire machine to desired sizes for inst., sizes 32, 34, 38, 46, etc. Each of the dials 154 and 155 are provided with graduations (not shown in the drawings) and will indicate simultaneously with the main dial the changes imparted to the individual portions of the patterns.

As has been said before the setting of my patterns may be done either simultaneously for cutting cloth for "ready-made" suits, or may be adjusted individually for "custom-made" clothes. When the former method is employed it is only necessary to operate wheel 135 until the main dial shows the proper size to which the garment is to be cut. The patterns will then adjust themselves automatically to the corresponding dimensions.

If it is necessary to make manual adjustments due to over or under size, or other differences in measurements in any particular part of the patterns, that part is disconnected by withdrawing the operating rod 139 from gear box 125, whereafter hand wheel 135 is operated in the manner stated previously until the proper size on dial 156 is indicated. Then the manual adjustment of the disconnected pattern portions takes place, and the cutting operation follows.

When the patterns are thus set, one or more layers of fabrics is drawn between rollers 30 and 31 and its end is attached to the attaching bar 34, guided upon rod 33 and then the attaching rod 34 is drawn toward the opposite end of the machine, so that the underface of the press platform is completely covered by the material. Now when any of the marking patterns are to be used, a sheet of paper or other material is placed thereupon and the press platform is lowered in the direction toward table 10 by operating either hand wheel 16 or pulley 22', until the material is pressed against the blades which causes the cutting of the material and the marking of the outlines of the patterns upon the sheet of paper placed over the marking blades.

While I have indicated a specific construction of my device be it understood that the drawings are merely diagrammatical and illustrate the broad principle of my invention only. I therefore wish to have it understood that I shall not be limited to the construction shown and I reserve for myself the right to make changes, improvements or completely work out my device in a practical and workable manner without departing from the broad scope of my invention, for which I claim:

1. In a garment cutting and marking device having a plurality of individual pattern resembling units provided with self-adjusting cutting or marking blades adapted to conform with the contours imparted to said units, a plurality of individual adjusting means in each of said units adapted to control the shaping of various portions of each of said units, a main connection for all of said adjusting means, all of said units, and means for collectively controlling and simultaneously operating all of said adjusting means through said main connection.

2. In a garment cutting and marking device having a plurality of individual pattern resembling units as per claim 1, gages associated with each of said individual adjusting means for indicating their position, and a main gage associated with the said main connection, for indicating the size to which all of said units are collectively adjusted.

3. In a garment cutting and marking device having a plurality of individual pattern resembling units provided with self adjusting cutting or marking blades adapted to conform with the contours imparted to said units, a plurality of individual adjusting means in each of said units, one portion of said adjusting means adapted to control the length adjustment of said units, the other portion of said adjusting means adapted to control the width adjustment of said units, each of said adjusting means provided with an individual gage for controlling and denoting the degrees of adjustments made, a main connection associating all of said gages and all of said adjusting means and provided with a main gage denoting various sizes, and said main connection adapted to facilitate simultaneous and collective adjustment of all the units and means for operating said main connection to the desired size indicated by said main gage.

4. In combination with a garment cutting and marking device as per claim 3, a stationary member for glidably supporting said units, a frame extending above said member, a press member associated with said frame and adapted to bear against said blades of said units.

5. In combination with a garment cutting and marking device as per claim 3, a stationary member for glidably supporting said units, a frame extending above said stationary member, a press member adapted to be guided within said frame and to descend upon said blades of said units and means for lowering or lifting said press member.

6. In combination with a garment cutting and marking device as per claim 5, fabric suspension and stretching means associated with said press member adapted to spread a piece of fabric over the length of said press member and between the latter and the said blades of said units.

In testimony whereof I affix my signature in presence of two witnesses.

ANIELLO LUONGO.

Witnesses:
VITO TRUGLIO,
FERDINANDO TRUGLIO.